3,192,113
N,N'-DIALKYLENEDIAMINES AS ANTI-
TUBERCULAR AGENTS
John Pashegy Thomas, Westwood, and Raymond George
Wilkinson, Montvale, N.J., Gunnar Sigurd Redin, New
City, N.Y., and Robert Gordon Shepherd, Ridgewood,
N.J., assignors to American Cyanamid Company, Stamford, Conn., a corporation of Maine
No Drawing. Filed Apr. 7, 1964, Ser. No. 358,052
6 Claims. (Cl. 167—65)

This application is a continuation-in-part of our copending application Serial No. 157,252, filed December 5, 1961, which, in turn, is a continuation-in-part of our application Serial No. 14,530, filed March 14, 1960, both now abandoned.

This invention relates to a method of treating mycobacterial infections in animals. More particularly, the present invention relates to the oral administration of compositions in which the anti-tuberculous ingredient is a substituted ethylenediamine which may be represented by the following general formula:

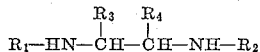

wherein $R_1$ and $R_2$ are each lower alkyl groups of from 3 to 8 carbon atoms, and $R_3$ and $R_4$ are hydrogen or methyl. Suitable lower alkyl groups may be, for example, isopropyl, iso-butyl, sec.-butyl, tert.-butyl, tert.-amyl, 1,3-dimethylbutyl, 1-propylbutyl, 1,1-diethylbutyl, 1,1,3,3-tetramethylbutyl, cyclopentyl, and cyclohexyl. The salts of the substituted ethylenediamines with both organic and inorganic acids are also included within the scope of the invention.

It is well known that tuberculosis is a contagious disease which usually runs a protracted course ending in death. It is caused by the tubercle bacillus *Mycobacterium tuberculosis* which is comparatively difficult to control. The commercial importance of compositions effective against tuberculosis via oral administration is beyond question, particularly tuberculosis in primates and Johne's disease in cattle. Until the discovery of streptomyin, it was impossible to attack the tubercle bacillus directly. Streptomycin, however, has a number of significant shortcomings, such as the fact that it is not always well tolerated and must be given by injection. Furthermore, the bacillus may become resistant to streptomycin so that it loses its therapeutic value. Paraaminosalicylic acid has also been found to be a weak anti-tuberculous agent. However, when used with streptomycin, it reinforces the action of streptomycin and delays the appearance of resistant strains of the bacillus. Nicotinamide, pyrazinamide, and isonicotinic acid hydrazide are also used clinically but each of these compounds also has significant shortcomings.

The substituted ethylenediamines which are the active ingredients of the compositions of the present invention may be prepared by one of two methods. Firstly, they may be prepared by the interaction of amines with ethylene dihalides. The reaction may be conducted by mixing the reactants with or without an inert solvent and then heating the resulting solution at from about 50° C. to about 200° C. for a period of time up to 40 hours. The inert solvent may be, for example, dioxane, the lower alkanols, or carbon tetrachloride. Secondly, they may be prepared by the reductive alkylation of ethylenediamines with ketones. This reaction is carried out by mixing the reactants in an inert solvent in the presence of a hydrogenation catalyst such as, for example, platinum on carbon, and contacting the suspension with hydrogen in a pressure vessel at a temperature of from about 25° C. to about 150° C. for a period of time up to twenty-four hours. The inert solvent may be, for example, dioxane, the lower alkanols, or carbon tetrachloride.

The substituted ethylenediamines which are the active ingredients of the compositions of the present invention may be administered either in the form of the free base or in the form of their acid addition salts. The inorganic acids which may be employed to form these acid addition salts may be, for example, hydrochloric, hydrobromic, sulfuric, and nitric. The organic acids which may be used to prepare the acid addition salts may be, for example, benzoic, acetic, tartaric, citric, and lactic.

A dosage unit of the substituted ethylenediamines or their non-toxic acid addition salts of the present invention comprises from about 10 milligrams to about 750 milligrams per kilogram of body weight per day. A preferred dosage unit form is a tablet containing the substituted ethylenediamine or its acid addition salt as an active ingredient. Such tablets should contain from 0.5 to 2 grams of the substituted ethylenediamine or its acid addition salt. Of course, a tablet scored to be broken into dosage units such as previously described or a number of tablets to be taken at one time to constitute a dosage unit may also be employed. A second preferred dosage unit form is a capsule containing as an active ingredient from 0.5 to 2 grams of the substituted ethylenediamine or its acid addition salt. The capsule may be of either the hard or soft variety and may be made of any suitable capsule material which will disintegrate in the digestive tract in from about 1 to 4 hours. Examples of such encapsulating materials are gelatin and methyl cellulose.

Of course, the dosage unit form of the substituted ethylenediamine or its acid addition salt may also contain either inert or medically active materials. For instance, when the dosage unit form is a tablet or granules there may also be present various binders, fillers, or solid diluents. There may also be present various medically active materials such as, for instance, para-aminosalicylic acid. When the dosage unit form is a capsule it may contain, in addition to materials of the above type, a liquid carrier such as fatty oil. And regardless of the dosage unit form, there may be present various flavors and excipients. Of course, any materials used in preparing the dosage unit forms must be substantially non-toxic in the amounts employed.

The substituted ethylenediamines and their acid addition salts of the present invention have been found to be active in vivo against tuberculosis. They exert an anti-tuberculous activity against the disease produced in mice by intravenous infection with *Mycobacterium tuberculosis* var. *hominis* strain H37Rv. This disease worsens and progresses into a fulminating disease involving various organs, especially the lungs, and is ultimately fatal. It has been found, as shown in Example 6 below, that in mice in which the disease has thus been established, the disease is arrested and death is averted by therapy with a diet containing the substituted ethylenediamines or their acid addition salts of the present invention.

The following examples demonstrate the antituberculous activity of the substituted ethylenediamines and their acid addition salts of the present invention and set forth methods of preparing them.

EXAMPLE 1

*N,N'-bis(1,1-dimethylpropyl)ethylenediamine dihydrochloride*

In 50 parts of 95% ethanol containing 5 parts water was dissolved 43.6 parts of tertiary amyl amine and 43.0 parts of ethylene dibromide. The mixture was heated to reflux for 40 hours, with a slight tan coloration occurring. The reaction mixture was concentrated to about one-half its original volume and treated with excess 10 M NaOH solution. The diamine base was extracted with two 50 ml. portions of benzene. After the benzene was carefully distilled off, the desired base,N,N'-bis(1,1-dimethylpropyl)ethylenediamine, was distilled at 110–115° C. under 15 mm. pressure.

The N,N'-bis(1,1-dimethylpropyl)ethylenediamine was converted to the dihydrocholride by adding about 2.2 equivalents of 5 N ethanolic HCl followed by an equal volume of acetone. Cooling to 0° C. gave white crystals which were filtered from the light yellow mother liquor and washed with acetone. The white crystalline dihydrochloride on drying melted at 234° C. with gas evolution. A small second crop of the same melting point was recovered from the filtrate to make the total yield of dihydrochloride from the base nearly quantitative.

EXAMPLE 2

*N,N'-bis(1,3-dimethylbutyl)ethylenediamine dihydrochloride*

A mixture of 52.2 parts of methylisobutyl ketone with 15 parts of ethylenediamine in 125 parts of absolute ethanol was catalytically reduced using 4.5 parts of 10% platinum on carbon catalyst. The hydrogen pressure was kept between 810 and 610 p.s.i. and the temperature was gradually raised from 32° to 70° C. After a total of six hours, 90% of the theoretical amount of hydrogen was consumed and the reduction was stopped. After filtering, the solvent was removed and the product was distilled at 93–95° C./1 mm. as a colorless oil, $n_D^{23}$ 1.4392.

The dihydrochloride of N,N'-bis(1,3-dimethylbutyl)-ethylenediamine was prepared from the diamine by adding about 2.2 equivalents of 1 N methanolic HCl. On cooling to 0° C. a white crystalline solid formed in the tan mother liquor. After filtering, washing the solid with acetone to remove color, and drying, the white crystals melted at 245.5 to 254.5° C. (corr.).

Recrystallization from methanol raised the melting point to 247.5–255.5° C.

EXAMPLE 3

*N,N'-bis(1-propylbutyl)ethylenediamine dihydrochloride*

A mixture of 57.1 parts of 4-heptanone with 15 parts of ethylenediamine in 125 parts of absolute ethanol was catalytically reduced using 4.5 parts of 10% platinum on carbon. The pressure range of the hydrogenation was 1175 to 760 p.s.i. and the temperature was gradually brought from 30 to 55° C. over five and one-half hours with theoretical hydrogen uptake. After removal of the catalyst and solvent, the product was distilled as a colorless oil at 126–129° C. at 1.5 mm.

The dihydrochloride of N,N'-bis(1-propylbutyl)ethylenediamine was prepared from the base by adding about 3 equivalents of 4 N ethanolic HCl and an equal volume of acetone. The light yellow solution on cooling to 5° C. gave white crystals. On filtering, washing with acetone, and drying, the solid melted at 192.5–194° C. (corr.). Recrystallization from ethanol with addition of acetone raised the melting point to 193.5–194.5° C.

EXAMPLE 4

*$N^1,N^2$-diisopropyl-1,2-propanediamine dihydrochloride*

A solution of 59 parts of 1,2-propanediamine in 118 parts of acetone was catalytically hydrogenated using 3.0 parts of 10% platinum on carbon catalyst at a pressure of 750–1510 p.s.i. The temperature was raised from 42 to 71° C. over two and one-half hours with hydrogen absorption of 87% of theory. After removing the catalyst and solvent, the product was distilled at 172 to 176° C., at atmospheric pressure as a colorless liquid.

Treatment of this $N^1,N^2$-diisopropyl-1,2-propanediamine with about 2.2 equivalents of 5 N ethanolic HCl, adding acetone, and cooling gave the dihydrochloride as white crystals, M.P. 170–187° C.

EXAMPLE 5

*$N^2,N^3$-diisopropyl-2,3-diaminobutane*

A solution of 22 parts of 2,3-diaminobutane in 58 parts of acetone was catalytically hydrogenated as in Example 4 using 5.0 parts of 10% platinum on carbon catalyst. Isolation as in Example 4 yielded the $N^2,N^3$-diisopropyl-2,3-diaminobutane as a colorless liquid, B.P. 176–178° C./1.0 atm.

The dihydrochloride salt was prepared as in Example 4; M.P. meso form 290–295° C., dl form 251–257° C.

EXAMPLE 6

Carworth Farms CFL white mice, females, 17 to 20 grams, were infected with *Mycobacterium tuberculosis* H37Rv by administration intravenously of 0.2 ml. of a buffered saline suspension containing approximately 1.5 mg./ml. wet weight of a 12 or 13 day culture of the test organism grown on Sauton's medium. Each compound listed in Table I below was administered orally for 14 days to groups of five infected mice by mixing with the feed at the dosage levels indicated in Table II below. The animals were fed untreated food for the remainder of the 30 day test-period; the controls were fed on untreated feed for the entire 30 days; and the results are set forth in Table II below.

A compound is considered active against this mycobacterial infection if: (1) treatment results in 2 or more survivors per group of 5 mice (i.e., a survival ratio of 2/5 or >2/5) on the 30th day after infection, or (2) the survival time of the treated animals is extended 4 or more days past that of the infected controls in the same test. Activity is regarded as confirmed if one or the other criterion is satisfied in a second test.

These criteria are based on experience with nontreated infected controls. Summarized below are the results obtained with nontreated infected controls for the years 1957 through 1960.

| Year | Dead/total Mice | Percent dead |
|---|---|---|
| 1957 | 1,106/1,115 | 99.19 |
| 1958 | 980/990 | 99.00 |
| 1959 | 557/560 | 99.46 |
| 1960 | 727/730 | 99.58 |
| 1957–1960 | 3,370/3,395 | 99.26 |

According to the "Tables of the Binomial Probability Distribution," Department of Commerce, National Bureau of Standards, Applied Mathematics Series .6 (1950), the frequency of occurrence of certain survival ratios in groups of 5 mice is as follows:

| Survival ratio, alive/total | Frequency of occurrence of various survival ratios | |
|---|---|---|
| | For 99% mortality | For 99.26% mortality |
| 0/5 | 0.95099 | 0.9635 |
| 1/5 | 0.04803 | 0.0359 |
| 2/5 | 0.00097 | 0.00054 |
| 3/5 | 0.0000099 | 0.000005 |

The frequency of occurrence of 2 out of 5 survivors, by chance, among mice treated with an ineffective compound would be five times in ten thousand tests, based on 99.26% mortality. The probability of obtaining such a result in two tests would then be $(0.0005)^2$ or twice in 10 million tests. Some compounds saved 3 out of 5 mice in two tests, the frequency of occurrence, by chance, being 2 in 100,000,000,000. For compounds active in more than two groups of 5 mice or for those saving 4 out of 5 or 5 out of 5 mice, the probability of occurrence by chance is very much less.

The activity criterion of 4 days survival over the infected non-treated controls is based on the coefficient of variation, which is the standard deviation expressed as a proportion of the mean. The average coefficient of variation for the 472 groups of infected nontreated mice for the years 1957–1960 was 0.0878. A prolongation of more than 2.6 days is statistically significant (probability level 0.05) for controls with an average survival time of 18 days. A prolongation of survival time of 4.7 days (3 standard deviations) beyond the death of the controls has a higher probability level (about 0.003). A confirmed prolongation of 2.6 days in two groups of five mice has a probability level of 0.01 and in three groups a probability level of 0.002, which means a possible frequency of occurrence, by chance, of 2 in 1,000.

TABLE I $$R_1-HN-\overset{R_3}{\underset{|}{C}H}-\overset{R_4}{\underset{|}{C}H}-NH-R_2$$

| $R_1$ | $R_2$ | $R_3$ | $R_4$ | Compound |
|---|---|---|---|---|
| Iso-propyl | Iso-propyl | H | H | I. |
| Do | do | H | H | II. |
| n-Butyl | n-Butyl | H | H | III. |
| Sec.-butyl | Sec.-butyl | H | H | IV. |
| t.-Butyl | t.-Butyl | H | H | V. |
| Iso-propyl | Iso-propyl | Me | H | VI. |
| t.-Amyl | t.-Amyl | H | H | VIII. |
| Cyclopentyl | Cyclopentyl | H | H | VIII. |
| Cyclohexyl | Cyclohexyl | H | H | IX. |
| 1-propylbutyl | 1-propylbutyl | H | H | X. |
| 1,1,3,3-tetramethyl butyl | 1,1,3,3-tetramethyl butyl | H | H | XI. |
| Sec.-butyl | Iso-propyl | H | H | XII. |

TABLE II.—ANTITUBERCULOUS ACTIVITY OF ETHYLENEDIAMINES OF TABLE I

| Compound | Results of the first two tests in mice | Drug dosage, percent in diet | Survival time, ratio a | Alive, Total at 30 days b |
|---|---|---|---|---|
| I | 1st test, treated | 0.4 | | 5/5 |
| | 20 nontreated infected controls | None | 17 | 0/20 |
| | 2d test, treated | 0.4 | | 5/5 |
| | do | 0.1 | | 5/5 |
| | do | 0.025 | 21/16 | 0/5 |
| | 20 nontreated infected controls | None | 16 | 0/20 |
| II | 1st test, treated | 0.8 | | 5/5 |
| | do | 0.4 | | 5/5 |
| | do | 0.1 | | 5/5 |
| | do | 0.05 | | 5/5 |
| | do | 0.025 | >26/23 | 1/5 |
| | 20 nontreated infected controls | None | 23 | 0/20 |
| | 2d test, treated | 0.8 | | 10/10 |
| | do | 0.4 | | 10/10 |
| | do | 0.2 | | 10/10 |
| | do | 0.1 | | 10/10 |
| | do | 0.05 | >26/16 | 2/10 |
| | do | 0.025 | 21/16 | 0/10 |
| | 20 nontreated infected controls | None | 16 | 0/20 |
| III | 1st test, treated | 0.2 | 22/17 | 0/5 |
| | 20 nontreated infected controls | None | 17 | 0/20 |
| | 2d test, treated | 0.2 | 20/16 | 0/5 |
| | 20 nontreated infected controls | None | 16 | 0/20 |
| IV | 1st test, treated | 0.2 | | 5/5 |
| | 20 nontreated infected controls | None | 17 | 0/20 |
| | 2d test, treated | 0.1 | >28/16 | 3/5 |
| | do | 0.05 | >26/16 | 1/5 |
| | 20 nontreated infected controls | None | 16 | 0/20 |
| V | 1st test, treated | 0.2 | | 5/5 |
| | do | 0.025 | 22/18 | 0/5 |
| | 20 nontreated infected controls | None | 18 | 0/20 |
| | 2d test, treated | 0.05 | | 5/5 |
| | do | 0.025 | >25/21 | 1/5 |
| | 20 nontreated infected controls | None | 21 | 1/20 |
| VI | 1st test, treated | 0.2 | >29/17 | 4/5 |
| | 20 nontreated infected controls | None | 17 | 0/20 |
| | 2d test, treated | 0.8 | | 5/5 |
| | do | 0.2 | | 5/5 |
| | do | 0.05 | >28/20 | 3/5 |
| | 20 nontreated infected controls | None | 20 | 0/20 |

TABLE II.—ANTITUBERCULOUS ACTIVITY OF ETHYLENEDIAMINES OF TABLE I—Continued

| Compound | Results of the first two tests in mice | Drug dosage, percent in diet | Survival time, ratio a | Alive, Total at 30 days b |
|---|---|---|---|---|
| VII | 1st test, treated | 0.2 | >26/20 | 3/5 |
| | do | 0.05 | >27/20 | 5/10 |
| | do | 0.025 | >26/20 | 1/5 |
| | 20 nontreated infected controls | None | 20 | 0/20 |
| | 2d test, treated | 0.2 | 23/18 | 0/10 |
| | do | 0.1 | >27/18 | 2/10 |
| | do | 0.05 | >22/18 | 1/10 |
| | 20 nontreated infected controls | None | 18 | 0/20 |
| VIII | 1st test, treated | 0.2 | 23/17 | 0/5 |
| | 20 nontreated infected controls | None | 17 | 0/20 |
| | 2d test, treated | 0.2 | 21/16 | 0/5 |
| | 20 nontreated infected controls | None | 16 | 0/20 |
| IX | Treated | 0.2 | >23/17 | 2/5 |
| | 20 nontreated infected controls | None | 17 | 0/20 |
| X | Treated | 0.8 | >30/23 | 4/5 |
| | do | 0.2 | >25/23 | 4/10 |
| | 20 nontreated infected controls | None | 23 | 0/20 |
| XI | Treated | 0.05 | >25/20 | 3/10 |
| | 20 nontreated infected controls | None | 20 | 0/20 |
| XII | 1st test, treated | 0.2 | | 5/5 |
| | do | 0.05 | >28/20 | 2/5 |
| | 20 nontreated infected controls | None | 20 | 0/20 |
| | 2d test, treated | 0.4 | | 5/5 |
| | do | 0.2 | | 5/5 |
| | do | 0.05 | 19/15 | 0/5 |
| | 20 nontreated infected controls | None | 15 | 0/20 | a The average survival time is given for the nontreated infected controls in days. For the drug-treated groups the ratio (e.g. 21/16) of the average survival time (e.g., 21 days) of the treated animals to the survival time of the infected controls (e.g. 16 days) is given.
b The experiment is arbitrarily ended at 30 days. The alive/total refers to the number of treated animals alive at 30 days compared to the total in this particular experimental group.

What is claimed is:

1. The method of treating *Mycobacterium tuberculosis* infections in animals which consists in administering orally in dosage unit form from 10 mg. to 750 mg. per kgm. of body weight per day of an ethylenediamine selected from the group consisting of a compound of the formula:

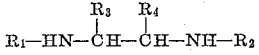

wherein $R_1$ and $R_2$ are each lower alkyl of from 3 to 8 carbon atoms, and $R_3$ and $R_4$ are selected from the group consisting of hydrogen and methyl, and its non-toxic acid-addition salts.

2. The method of treating *Mycobacterium tuberculosis* infections in animals, which consists in administering orally in dosage unit form from 10 mg. to 750 mg. per kgm. of body weight per day of N,N'-di(iso-propyl)ethylenediamine dihydrochloride.

3. The method of treating *Mycobacterium tuberculosis* infections in animals which consists in administering orally in dosage unit form from 10 mg. to 750 mg. per kgm. of body weight per day of N,N'-di(tert.-butyl)-ethylenediamine dihydrochloride.

4. The method of treating *Mycobacterium tuberculosis* infections in animals which consists in administering orally in dosage unit form from 10 mg. to 750 mg. per kgm. of body weight per day of N,N'-di(iso-propyl)-1,2-propanediamine dihydrochloride.

5. The method of treating *Mycobacterium tuberculosis* infections in animals which consists in administering orally in dosage unit form from 10 mg. to 750 mg. per kgm. of body weight per day of N,N'-di(1,1,3,3,-tetramethylbutyl)ethylenediamine dihydrochloride.

6. The method of treating *Mycobacterium tuberculosis* infections in animals which consists in administering orally in dosage unit form from 10 mg. to 750 mg. per kgm.

of body weight per day of N-sec.-butyl-N'-iso-propyl-ethylenediamine dihydrochloride.

References Cited by the Examiner

Loutit: Scientific American, September 1959, 201:3, page 134.

Science News Letter, November 26, 1955, page 244, "Sees Many Drugs Lost Because Man Not Mouse."

References Cited by the Applicant

Annales de l'Institut Pasteur, Tome Quatre-Vingt-Quatorzieme, pages 694–708, 1958.

Canadian Journal of Microbiology, volume 5, pages 305–309, 1959.

Comptes Rendus de l'Academie des Sciences, Tome Deux-Cent-Quarante-Quatrieme, pages 402–411, 1957.

Journal of Pharmacy and Pharmacology, volume V, pages 849–860, 1953.

The American Review of Tuberculosis, volume 69, No. 3, pages 419–442, 1954.

The American Review of Tuberculosis, volume 70, pages 413–429, 1954.

The American Review of Tuberculosis, volume LVIII, pages 487–493, 1948.

The American Review of Tuberculosis, volume LVIII, pages 479–486, 1948.

The American Review of Tuberculosis, volume 63, pages 1–3, 1951.

The American Review of Tuberculosis, volume 65, pages 365–375, 1952.

The American Review of Tuberculosis, volume 65, pages 376–391, 1952.

The Journal of Pharmacology and Experimental Therapeutics, volume 107, pages 219–224, 1953.

The Journal of Infectious Diseases, volume 106, pages 213–223, 1960.

JULIAN S. LEVITT, *Primary Examiner.*

L. GOTTS, *Examiner.*